United States Patent
Konno

(10) Patent No.: US 9,832,447 B2
(45) Date of Patent: Nov. 28, 2017

(54) IMAGE PROCESSING SYSTEM AND IMAGE PROCESSING PROGRAM

(71) Applicant: Amatel Inc., Tokyo (JP)

(72) Inventor: Joji Konno, Tokyo (JP)

(73) Assignee: AMATEL INC., Tokyo (JP)

( * ) Notice: Subject to any disclaimer, the term of this patent is extended or adjusted under 35 U.S.C. 154(b) by 154 days.

(21) Appl. No.: 14/781,642

(22) PCT Filed: Apr. 4, 2013

(86) PCT No.: PCT/JP2013/060303
§ 371 (c)(1),
(2) Date: Dec. 15, 2015

(87) PCT Pub. No.: WO2014/162554
PCT Pub. Date: Oct. 9, 2014

(65) Prior Publication Data
US 2016/0119607 A1  Apr. 28, 2016

(51) Int. Cl.
*H04N 7/18* (2006.01)
*H04N 13/00* (2006.01)
(Continued)

(52) U.S. Cl.
CPC ........... *H04N 13/0029* (2013.01); *G06T 3/00* (2013.01); *H04N 13/0003* (2013.01);
(Continued)

(58) Field of Classification Search
CPC .. G06T 3/00; H04N 13/0003; H04N 13/0011; H04N 13/0022; H04N 13/0055; H04N 13/0242
(Continued)

(56) References Cited

U.S. PATENT DOCUMENTS 4,783,160 A * 11/1988 Tanaka ................... G02B 21/22
359/363
5,850,352 A * 12/1998 Moezzi .................. H04N 5/222
345/419
(Continued)

FOREIGN PATENT DOCUMENTS

JP    2002-031515 A    1/2002
JP    2005-173685 A    6/2005
(Continued)

*Primary Examiner* — Helen Shibru
(74) *Attorney, Agent, or Firm* — Polsinelli PC

(57) ABSTRACT

In the present invention, the following are provided: a 3D information generating unit (3) for generating 3D information as the data of a group of a plurality of points formed by projecting the values of respective pixels of a moving object in accordance with depth information detected from an image pickup image; an overlooking image generating unit (4) for generating an overlooking image by synthesizing the 3D information of the moving object with a space image of an image pickup target region; and a display control unit (5) for displaying the overlooking image. The present invention is configured so that, even in a case where there are multiple image pickup target regions in a large-scale building in which the floor configuration is complicated, it is unnecessary to display multiple image pickup images using split screen display, and by displaying one overlooking image formed by synthesizing the 3D information of the moving objects formed from the groups of a plurality of points with each of a plurality of image pickup target regions which are included in the entire space of the building, the overall state of the building can be ascertained in one glance by confirming the overlooking image.

5 Claims, 10 Drawing Sheets

(51) Int. Cl.
*G06T 3/00* (2006.01)
*H04N 13/02* (2006.01)
*H04N 13/04* (2006.01)

(52) U.S. Cl.
CPC ..... *H04N 13/0011* (2013.01); *H04N 13/0022* (2013.01); *H04N 13/0055* (2013.01); *H04N 13/0242* (2013.01); *H04N 13/0239* (2013.01); *H04N 13/0468* (2013.01); *H04N 2013/0081* (2013.01); *H04N 2013/0088* (2013.01)

(58) Field of Classification Search
USPC .................................................. 348/154, 42
See application file for complete search history.

(56) References Cited

U.S. PATENT DOCUMENTS

| | | |
|---|---|---|
| 2009/0040309 A1 | 2/2009 | Ishii |
| 2009/0131836 A1 | 5/2009 | Enohara et al. |
| 2013/0163961 A1* | 6/2013 | Wu ........................ H04N 5/772 386/280 |
| 2013/0304604 A1* | 11/2013 | Hoffman ............ G06Q 30/0621 705/26.5 |
| 2014/0010430 A1* | 1/2014 | Chandelier .......... A61B 6/5217 382/131 |
| 2015/0116693 A1* | 4/2015 | Ohtomo ................ G01C 15/002 356/4.01 |
| 2015/0178321 A1* | 6/2015 | Rivlin ............... G06F 17/30277 707/728 |
| 2016/0012646 A1* | 1/2016 | Huang .................... G06T 5/005 345/419 |

FOREIGN PATENT DOCUMENTS

| | | |
|---|---|---|
| JP | 2005-252831 A | 9/2005 |
| JP | 2006-109118 A | 4/2006 |
| JP | 2008-118466 A | 5/2008 |
| JP | 2008-217602 A | 9/2008 |
| JP | 2012-004630 A | 1/2012 |
| WO | WO-2012/124331 A1 | 9/2012 |

* cited by examiner

Fig. 4
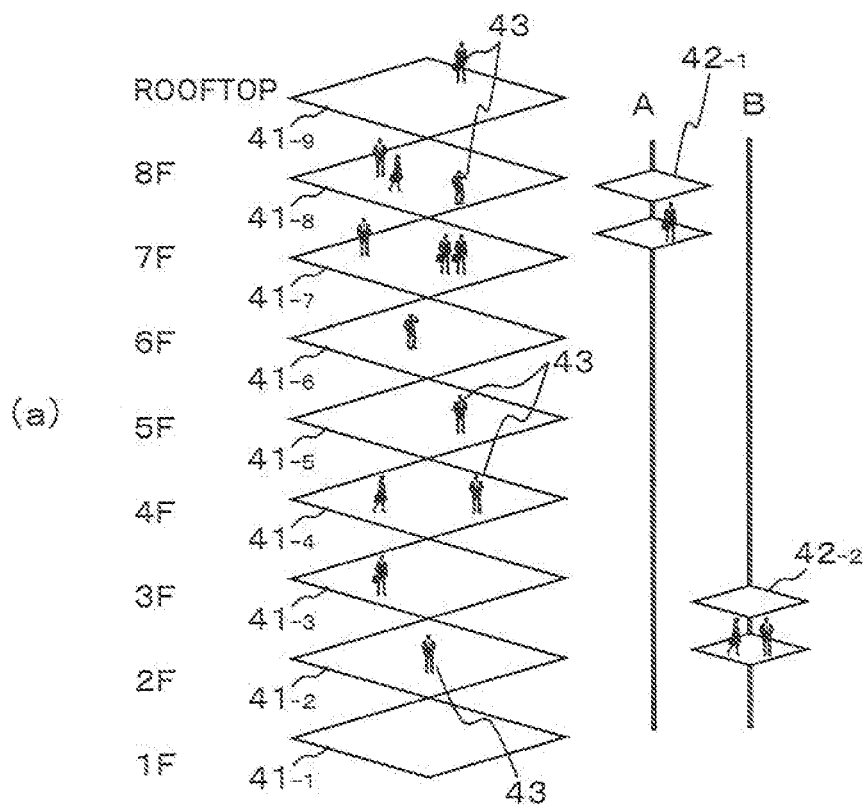
(a)
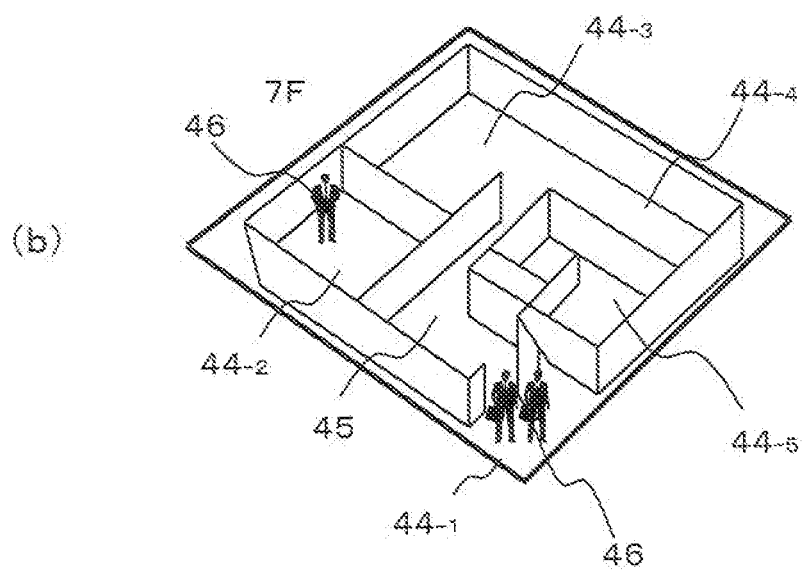
(b)

Fig. 5

| MOVING OBJECT ID | PIXEL POSITION OF MOVING OBJECT | IMAGE ID |
|---|---|---|
|  |  |  |

IMAGE PROCESSING SYSTEM AND IMAGE PROCESSING PROGRAM

CROSS REFERENCE TO RELATED APPLICATIONS

This application is a National Phase filing under 35 U.S.C. §371 of PCT/JP2013/060303 filed on Apr. 4, 2013, the entire contents of which are hereby incorporated by reference.

TECHNICAL FIELD

The present invention relates to an image processing system and an image processing program and more particularly to an image processing system and an image processing program including a function for detecting a moving object from an image photographed by a camera and displaying the detected moving object as 3D information.

BACKGROUND ART

A conventional monitoring system displays a plurality of monitoring images photographed by a plurality of monitoring cameras on a plurality of image display devices or displays the monitoring images on a single image display device by division, thereby performing monitoring. Alternatively, a plurality of monitoring images is switched by time division and is displayed on a single image display device, thereby performing monitoring. However, the conventional monitoring system is not suitable for the case in which an inner part of a building having a complicated structure is monitored.

In other words, a large-scaled building such as a factory or a building has a complicated floor structure and a large number of rooms. In order to monitor an inner part of the building having the complicated structure, a large number of cameras are provided so that the number of monitoring images to be displayed on an image display device is also increased. For this reason, it is hard to grasp, at a glance, which floor and which room for a plurality of monitoring images displayed on the image display device and it is difficult to understand a situation of the whole building.

In contrast, there is proposed a system for synthesizing monitoring images photographed by monitoring cameras provided for each of monitoring regions of a floor with another prepared floor image, thereby enabling the monitoring images to be displayed on a single screen at a time in accordance with a layout of the floor (for example, see Patent Document 1). According to the technique described in the Patent Document 1, it is possible to simultaneously monitor monitoring regions such as an inner part of each room, a corridor or the like in a building through a single screen in accordance with a layout of a floor.

Referring to the technique described in the Patent Document 1, however, the monitoring images photographed by the monitoring cameras provided in respective monitoring regions are simply allocated and displayed in positions of the monitoring regions for a planar floor image shown in a top view. Accordingly, this is basically the same as division and display of a plurality of monitoring images on a single image display device to perform monitoring. Therefore, it is possible to grasp which monitoring region has the monitoring images photographed. However, there is a problem in that it is necessary to individually confirm the monitoring images in order to understand a situation of a whole building and it is still hard for a user to use them.

Moreover, the technique described in the Patent Document 1 is not suitable for monitoring a building having a large scale and a complicated floor structure. In other words, the technique of the Patent Document 1 serves to divide and display the monitoring images on a single screen. For this reason, the number of images which can be displayed has a limit. As shown in FIG. 7 of the Patent Document 1, really, the monitoring images photographed in the monitoring regions in one floor can be simply displayed and cannot be used for wholly monitoring a large-scaled and complicated building such as a factory, a building or a department store. If a large number of monitoring images are to be forcibly displayed on a single screen, display sizes of the individual monitoring images are reduced so that they are hard to see.

According to FIG. 9 in Japanese Laid-Open Patent Publication No. 2008-118466 (Patent Document 2) cited as the prior art document in paragraph [0004] of the Patent Document 1, monitoring images in a plurality of rooms are synthetized to generate an overlooking image every floor (such an image as to look at each floor downward) and overlooking images in the floors are further synthesized to generate floor superposition images 1F to 3F. Consequently, a whole monitoring image of a building having a plurality of floors or the like can be displayed on a single screen.

When a whole monitoring image of a large-scaled and complicated building is to be thus displayed on the single screen, however, display sizes of the monitoring images in the individual monitoring regions are reduced so that the monitoring images are very hard to see. Accordingly, it is also difficult to say that the technique described in the Patent Document 2 is suitable for monitoring a building having a large scale and a complicated floor structure.

Patent Document 1: Japanese Laid-Open Patent Publication No. 2012-4630
Patent Document 2: Japanese Laid-Open Patent Publication No. 2008-118466

DISCLOSURE OF THE INVENTION

The present invention has been made to solve these problems and has an object to enable an overlooking image of a building having a large scale and a complicated floor structure to be offered so as to be easily understood and to enable a user to readily grasp a situation of the whole building.

In order to solve the problem, the present invention includes an image input unit for inputting photographed images respectively from a plurality of cameras provided to photograph a photographing target region at a plurality of angles, a depth information calculating unit for calculating, every pixel, depth information representing distances from the cameras of moving objects included in the input photographed images, a 3D information generating unit for setting a plurality of projection planes in adaptation to a relative angular relationship between the cameras and projecting values of each of pixels of the moving objects included in the photographed images in directions of the projection planes corresponding to the respective photographed images in accordance with the depth information, thereby generating 3D information obtained by synthesizing, into one, the moving objects included in the photographed images, an overlooking image generating unit for synthesizing the 3D information of the moving object with a space image representing a space of the photographing target region, thereby generating an overlooking image of the photographing target region, and a display control unit for displaying the generated overlooking image on a display.

According to the present invention having the structure described above, the 3D information of the moving objects are generated as data on groups of a plurality of points formed by projecting the values of the respective pixels in the directions of the projection planes in accordance with the depth information detected from the photographed images, the 3D information are synthesized with the space image of the photographing target region and the synthesized image is displayed as a single whole overlooking image. For this reason, even if the number of the photographing target regions is increased in a building having a large scale and a complicated floor structure, a large number of photographed images are neither displayed by screen division nor displayed by switching through time division. In other words, a single overlooking image which has a plurality of photographing target regions in a whole space of the building, and which is formed by synthesizing the 3D information of the groups of a plurality of points in each of the photographing target regions is displayed on a display.

Consequently, a user does not need to conventionally perform individual confirmation of a plurality of photographed images displayed every photographing target region but can grasp a situation of the whole building at a glance by confirming the overlooking image. Moreover, it is also possible to eliminate a disadvantage that the individual photographed image displayed by the screen division is hard to see due to a reduction in a display size thereof. According to the present invention, therefore, an overlooking image of a building having a large scale and a complicated floor structure can be offered so as to be easily understood and the user can readily grasp the situation of the whole building.

According to the present invention, moreover, the values of the respective pixels of the moving objects included in the respective photographed images obtained by photographing the photographing target region at a plurality of angles are projected from the photographed images in the directions of the projection planes of the respective photographed images so that the 3D information are synthesized. By moving a position of a virtual viewpoint for seeing the overlooking image including the 3D information of the moving objects to change an azimuth of the projection plane, therefore, it is possible to perform optional switching into an overlooking image seen at various angles, thereby displaying the overlooking image on a display.

In the related art, a single camera is provided in a single photographing target region. For this reason, it is possible to display only a photographed image in a direction in which the camera is provided. Even if a plurality of cameras is provided in the single photographing target region, a plurality of photographed images obtained by photographing the single photographing target region at a plurality of angles can be simply displayed by screen division or time division.

In contrast, according to the present invention, the overlooking image of the photographing target region including the 3D information of the moving objects processed into the data on the groups of a plurality of points from the photographed images can be displayed on the display, and furthermore, the viewpoint of the overlooking image can be optionally switched and displayed as described above. For example, consequently, an object hidden behind something as seen at a certain angle can also be displayed with the angle of the overlooking image changed.

BRIEF DESCRIPTION OF THE DRAWINGS

FIG. 4 is a view showing an example of an overlooking image to be displayed on a display by a display control unit according to the first to third embodiments.

FIG. 5 is a table showing an example of relevant information to be stored in a relevant information storing unit according to the first to third embodiments.

BEST MODE FOR CARRYING OUT THE INVENTION

First Embodiment

Figure 1:
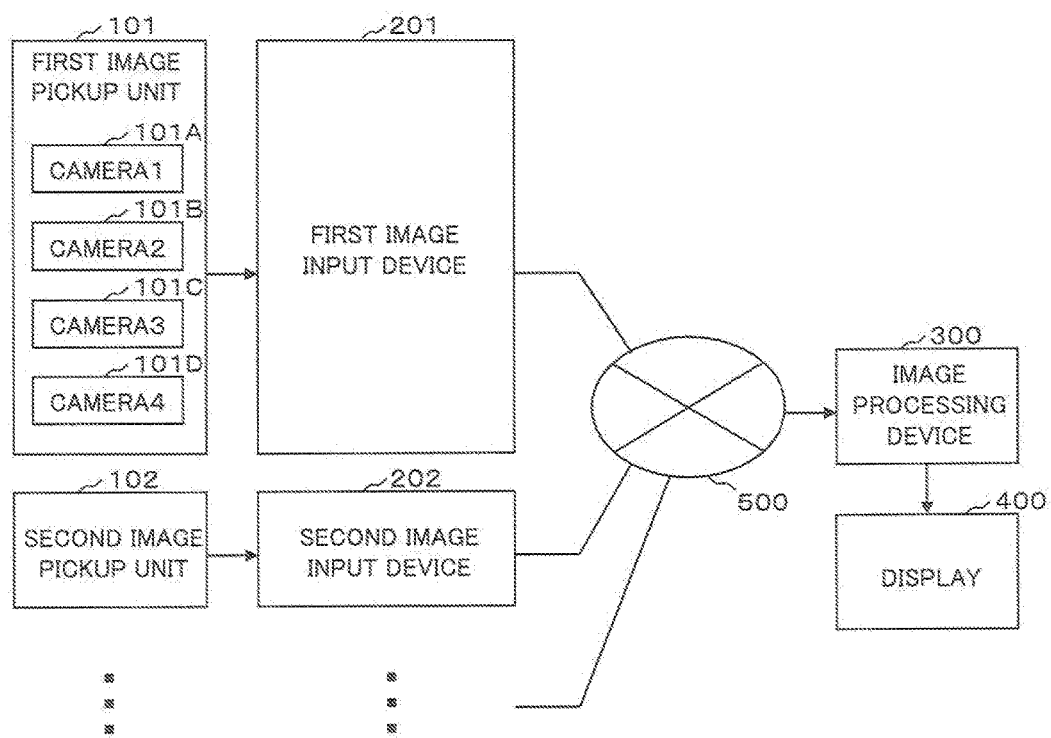
FIG. 1 is a diagram showing an example of a structure of an image processing system according to first and third embodiments.

A first embodiment of the present invention will be described below with reference to the drawings. FIG. 1 is a diagram showing an example of a structure of an image processing system according to the first embodiment. In the first embodiment, there is shown an example in which the image processing system according to the present invention is executed in a monitoring system.

As shown in FIG. 1, a monitoring system according to the first embodiment includes a plurality of image pickup units 101, 102, . . . , a plurality of image input devices 201, 202, . . . , an image processing device 300, and a display 400. The image pickup units 101, 102, . . . are connected to the image input devices 201, 202, . . . , respectively. Moreover, the image input devices 201, 202, . . . are connected to the image processing device 300 through an in-house network 500 in a building.

The image pickup units 101, 102, . . . are provided every photographing target regions in the building. Herein, the photographing target regions indicate desirable space regions to be monitoring targets, for example, inner parts of respective rooms, corridors, steps, elevators and the like present in respective floors of the building. A single image pickup unit is allocated to a single photographing target region. In the following, for convenience of explanation, description will be given on the assumption that the two image pickup units 101 and 102 are provided.

A single image pickup unit includes a plurality of cameras. For example, the first image pickup unit 101 includes four cameras 101A to 101D. The second image pickup unit 102 also includes a plurality of cameras, which is not shown in FIG. 1. The number of the cameras provided in the second image pickup unit 102 does not need to be equal to that of the first image pickup unit 101.

The cameras 101A to 101D are provided to photograph the photographing target region at a plurality of angles. For example, in the case in which a certain room is set to be the photographing target region, wall surfaces in four direction of the room are provided with the four cameras 101A to 101D so as to enable a whole inner part of the room to be photographed. In this case, it is preferable to set positions or postures of the respective cameras 101A to 101D in such a manner that respective photographing ranges overlap with each other in at least a part thereof.

All of these cameras 101A to 101D are stereo cameras and simultaneously photograph targets in the photographing target regions in two different directions. As will be described below, the image processing device 300 analyzes the photographed image through a known technique, thereby enabling information in a depth direction of a target to be acquired.

A plurality of image input devices 201 and 202 serves to input photographed images from the image pickup units 101 and 102 respectively, and is configured from a personal computer or the like, for example. Although the first image input device 201 is connected to the first image pickup unit 101 and the second image input device 202 is connected to the second image pickup unit 102 in the example of FIG. 1, the present invention is not restricted to such a connection configuration. For example, the two image pickup units 101 and 102 may be connected to a single image input device and a photographed image may be input from the two image pickup units 101 and 102 to the single image input device.

The image processing device 300 inputs photographed images from the image input devices 201 and 202 to perform image processing which will be described below in detail. Then, the display 400 is caused to display an image obtained as a result of the image processing. Herein, the image processing device 300 is configured from a personal computer or a server device, for example, and is provided in a monitoring room in a building or the like. Moreover, the display 400 is configured from a liquid crystal display, for example.

Figure 2:
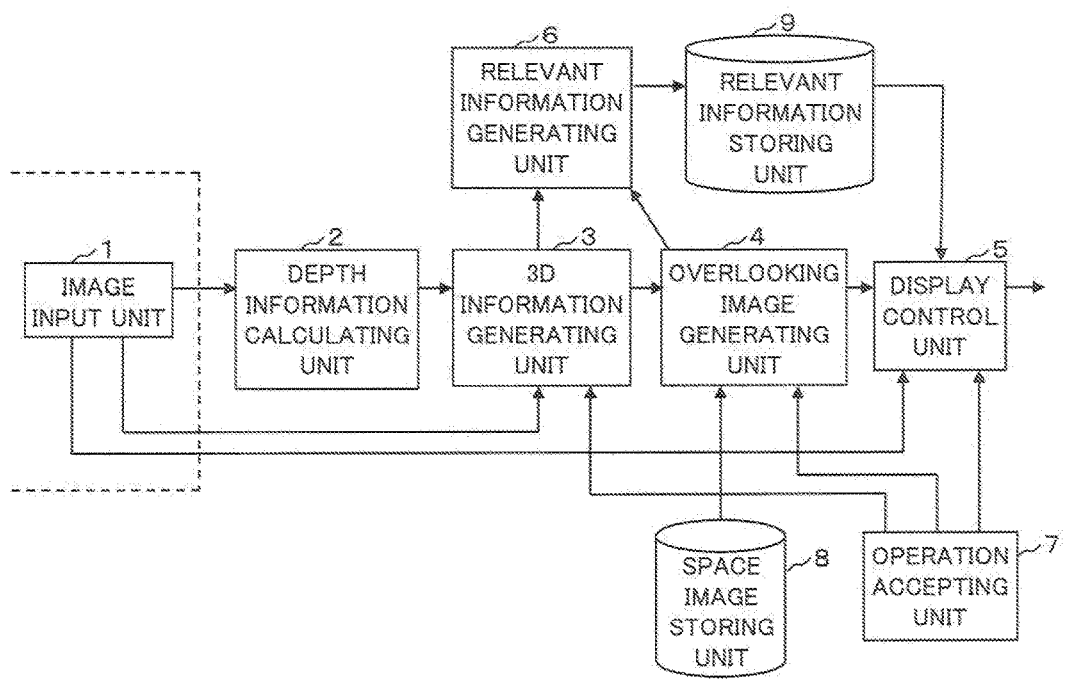
FIG. 2 is a block diagram showing an example of a functional structure of the image processing system according to the first embodiment.

In the system structure shown in FIG. 1, portions of the image input devices 201 and 202 and the image processing device 300 correspond to the image processing system according to the present invention. FIG. 2 is a block diagram showing an example of a functional structure of the image processing system. As shown in FIG. 2, the image processing system according to the first embodiment includes, as a functional structure thereof, an image input unit 1, a depth information calculating unit 2, a 3D information generating unit 3, an overlooking image generating unit 4, a display control unit 5, a relevant information generating unit 6, an operation accepting unit 7, a space image storing unit 8 and a relevant information storing unit 9.

Herein, a function of the image input unit 1 is provided in the image input devices 201 and 202 shown in FIG. 1, respectively. Moreover, respective functions of the depth information calculating unit 2, the 3D information generating unit 3, the overlooking image generating unit 4, the display control unit 5, the relevant information generating unit 6, the operation accepting unit 7, the space image storing unit 8 and the relevant information storing unit 9 are provided in the image processing device 300 shown in FIG. 1.

The respective functions of the depth information calculating unit 2, the 3D information generating unit 3, the overlooking image generating unit 4, the display control unit 5, the relevant information generating unit 6 and the operation accepting unit 7 provided in the image processing device 300 can be configured from all of hardware, a DSP (Digital Signal Processor) and software. In the case in which the functions are configured from the software, for example, they actually include a CPU, an RAM, an ROM and the like in the image processing device 300 and are implemented by an operation of an image processing program stored in a recording medium such as the RAM, the ROM, a hard disk or a semiconductor memory.

The image input unit 1 inputs photographed images from a plurality of cameras, respectively. In other words, the image input unit 1 provided in the first image input device 201 inputs photographed images from the cameras 101A to 101D, respectively. Moreover, the image input unit 1 provided in the second image input device 202 inputs photographed images from a plurality of cameras (not shown in FIG. 1), respectively.

The depth information calculating unit 2 calculates, every pixel, depth information representing distances from cameras of moving objects included in the photographed images input by the image input unit 1. As described above, the photographed image to be input by the image input unit 1 is a parallax image photographed by a stereo camera. The depth information calculating unit 2 analyzes the parallax image by a known technique, thereby calculating, every pixel, the depth information representing the distance from the camera of the moving object.

As a method of extracting the moving object from an inner part of the photographed image, it is possible to apply various methods. For example, by detecting a difference between frame images to be photographed sequentially by the cameras 101A to 101D in accordance with a predetermined frame rate, it is possible to extract a region making the difference as a region of the moving object. By storing, as a background image, an image photographed previously in a state in which a photographing target region has no moving object and detecting a difference between the photographed image and the background image, alternatively, it is also possible to extract the region making the difference as the region of the moving object.

The 3D information generating unit 3 generates 3D information of the moving object from the photographed images input from the image input unit 1 by utilizing the depth information calculated by the depth information calculating unit 2. Herein, the 3D information generating unit 3 generates a set of 3D information for a single photographing target region. For example, a set of 3D information is generated from four photographed images input to the image input unit 1 from the four cameras 101A to 101D provided in the first image pickup unit 101. One set implies a set of 3D information of moving objects if the moving objects are extracted from the photographed image.

Figure 3:
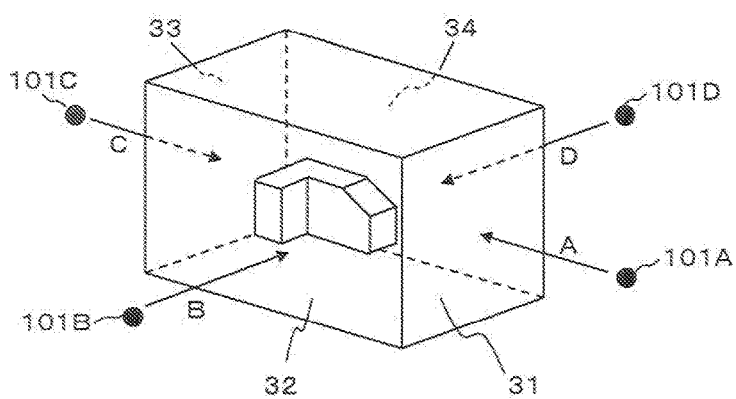
FIG. 3 is a view for explaining processing of a 3D information generating unit according to the first to third embodiments.

Specific processing contents of the 3D information generating unit 3 will be described below with reference to FIG. 3. FIG. 3 is an explanatory view showing processing for generating 3D information of a moving object from a plurality of photographed images. As shown in FIG. 3, the 3D information generating unit 3 sets a plurality of projection planes 31 to 34 in adaptation to a relative angular relationship among the cameras 101A to 101D. In the example of FIG. 3, for simple explanation, the projection planes 31 to 34 are set in four directions at an angle of 90 degrees each other.

In other words, the four cameras 101A to 101D are provided in positions shown in a mark ● (for example, wall surfaces in four directions in a room), and postures of the respective cameras 101A to 101D are set to perform photographing in directions shown in arrows A to D from those positions. The 3D information generating unit 3 sets the projection planes 31 to 34 in photographing directions corresponding to attachment positions and attachment postures of the respective cameras 101A to 101D. Information related to the attachment positions and the attachment postures of the respective cameras 101A to 101D are registered in the 3D information generating unit 3 by previous calibration.

The 3D information generating unit 3 projects values of respective pixels of the moving objects included in the photographed images input by the image input unit 1 (the photographed images of the four cameras 101A to 101D in the example of FIG. 3) in accordance with the depth information in the directions of the projection planes 31 to 34 corresponding to the respective photographed images, thereby generating 3D information obtained by synthesizing, into one, the moving objects included in the photographed images.

In other words, the 3D information generating unit 3 draws values of respective pixels of the moving objects included in the photographed image input from the first camera 101A to the image input unit 1 in a position projected by a distance represented by the depth information from the position of the first camera 101A in the direction of the arrow A in which the projection plane 31 is present. Herein, the value of each pixel to be drawn may be a value of R, G or B possessed originally by the photographed image or may be a binary value, a gray scale value or the like.

The 3D information generating unit 3 also performs the same processing for the photographed images input from the second to fourth cameras 101B to 101D to the image input unit 1. In the present embodiment, thus, the same photographing target region is photographed by the cameras 101A to 101D and the values of the respective pixels of the moving objects included in the respective photographed images are synthesized onto a single image. For this reason, a plurality of pixel values is projected in overlap onto the same pixel position in a plurality of directions.

In this case, the 3D information generating unit 3 preferentially draws 3D information to be synthesized on a front surface of a three-dimensional object as seen from a virtual viewpoint (a point in a direction of a user's side of a display screen) seen by a user. In the example of FIG. 3, the values of the pixels included in the photographed images obtained by the first camera 101A and the second camera 101B are drawn preferentially over the values of the pixels included in the photographed images obtained by the third camera 101C and the fourth camera 101D. It is possible to optionally determine which has priority, the photographed image obtained by the first camera 101A or the photographed image obtained by the second camera 101B. For example, it is possible to perform processing for giving priority to a shorter distance represented by the depth information.

The overlooking image generating unit 4 synthesizes the 3D information of the moving objects generated by the 3D information generating unit 3 with a space image representing a space of the photographing target region, thereby generating an overlooking image of the photographing target region. The space image is 3D information representing the photographing target region three-dimensionally and a space image generated previously is stored in the space image storing unit 8.

The space image stored in the space image storing unit 8 three-dimensionally represents a space of an individual photographing target region such as each room, a corridor, a step or an elevator (which will be hereinafter referred to as an individual region), and furthermore, three-dimensionally represents a space of a region having a plurality of photographing target regions compounded (which will be hereinafter referred to as a compound region), for example, a whole building or a whole floor.

A user can optionally designate which photographing target region having 3D information to be synthesized and which space image for the synthesis by the overlooking image generating unit 4. In other words, the user operates an operating unit (not shown) to enable designation as to which individual region or compound region in the whole building, the whole floor, a room in a floor, a corridor, a step and an elevator is to be displayed as an overlooking image on the display 400.

The operation accepting unit 7 accepts the operation for designating a region to notify the overlooking image generating unit 4 of the designated content. Upon receipt of the notification, the overlooking image generating unit 4 reads a space image of a designated region (hereinafter referred to as a display target region) from the space image storing unit 8. Then, the 3D information of the moving objects generated by the 3D information generating unit 3 for the display target region is synthesized with the read space image to generate an overlooking image. The operation accepting unit 7 may also notify the 3D information generating unit 3 of the content of the region designation to generate the 3D information of the moving objects for only the designated display target region.

The display control unit 5 controls to display, on the display 400, the overlooking image generated by the overlooking image generating unit 4. As described above, in the present embodiment, the user can designate which region has an overlooking image to be displayed on the display 400 by the user's operation of the operating unit. The display control unit 5 controls to display, on the display 400, the overlooking images generated by the 3D information generating unit 3 and the overlooking image generating unit 4 for the designated display target region.

In the present embodiment, moreover, by moving a position of a virtual viewpoint where the user sees the overlooking image (a point in the direction of the user's side of the display screen) to change the azimuths of the projection planes 31 to 34, it is also possible to perform optional switching into an overlooking image seen at various angles and to display the overlooking image on the display 400. The operation accepting unit 7 accepts an operation for moving the viewpoint and notifies the 3D information generating unit 3 and the overlooking image generating unit 4 of the content of the designation.

The 3D information generating unit 3 sets the projection planes 31 to 34 seen from the position of the designated viewpoint and generates the 3D information of the moving objects by the processing described above. Moreover, the overlooking image generating unit 4 deforms the space image read from the space image storing unit 8 into 3D information seen from the position of the designated viewpoint, and furthermore, synthesizes the 3D information of the moving objects generated by the 3D information generating unit 3, thereby generating an overlooking image. The display control unit 5 causes the display 400 to display the overlooking image thus seen from the designated viewpoint.

FIG. 4 is a view showing an example of the overlooking image to be displayed on the display 400. FIG. 4(a) shows an overlooking image to be displayed when a whole building is designated as a display target region. Moreover, FIG. 4(b) shows an overlooking image to be displayed when a certain specific floor (herein, a $7^{th}$ floor) is designated as the display target region.

In FIG. 4(a), $41_{-1}$ to $41_{-9}$ denote a space image showing each floor in the building and $42_{-1}$ and $42_{-2}$ denote a space image representing an elevator in the building. A space image of the whole building is configured from the space images $41_{-1}$ to $41_{-9}$ of the respective floors and the space images $42_{-1}$ and $42_{-2}$ of the respective elevators. The space image of the whole building does not strictly represent structures of the respective floors and the elevator and a positional relationship therebetween but represent them in simplification.

In FIG. 4(a), moreover, 4 stereoenotes the 3D information of the moving objects generated by the 3D information generating unit 3. In the present embodiment, the photographing target regions are set to each room of each floor or the like and the 3D information of the moving objects are generated by the 3D information generating unit 3 for respective photographing target regions. When an overlooking image of a compound region such as a whole building is to be displayed as shown in FIG. 4(a), 3D information of the moving objects generated for the respective photographing target regions are synthetized with the space image of the whole building in a corresponding position in each room of each floor.

In FIG. 4(b), $44_{-1}$ to $44_{-5}$ denote respective rooms in a floor and 45 denotes a corridor in the floor. A space image of the whole floor is configured from the respective rooms $44_{-1}$ to $44_{-5}$ and the corridor 45. The space image of the whole floor represents the structures of the respective rooms and the corridor and the positional relationship therebetween strictly to some degree.

In FIG. 4(b), furthermore, 46 denotes the 3D information of the moving objects generated by the 3D information generating unit 3. In an example shown in FIG. 4(b), the 3D information of the moving objects generated by the 3D information generating unit 3 for the respective photographing target regions set to each room and a corridor in a floor are synthesized with a corresponding position in the space image of the whole floor.

Returning to FIG. 2, description will be given. The relevant information generating unit 6 generates relevant information for relating positions of each pixel configuring 3D information of moving objects to a photographed image serving as a projection source of a value of the pixel and stores the relevant information in the relevant information storing unit 9. FIG. 5 is a table showing an example of the relevant information to be stored in the relevant information storing unit 9.

As shown in FIG. 5, the relevant information has moving object IDs given uniquely to 3D information of individual moving objects, coordinate positions on an overlooking image of each pixel configuring the 3D information, and image IDs uniquely given to a photographed images serving as a projection source of values of each pixel configuring the 3D information.

A single 3D information is generated from a plurality of photographed images obtained by a plurality of cameras. In other words, there is a plurality of photographed images serving as projection sources of values of respective pixels configuring the 3D information. Accordingly, a plurality of image IDs is stored for a single moving object ID.

Herein, the moving object ID and the image ID are given when the 3D information generating unit 3 generates 3D information of a moving objects from photographed images and the relevant information generating unit 6 is notified of them. Moreover, coordinate positions on an overlooking image of each pixel configuring 3D information are specified when the overlooking image generating unit 4 synthesizes 3D information with a space image to generate an overlooking image, and the relevant information generating unit 6 is notified of the coordinate position.

The display control unit 5 controls the display 400 to display a photographed image related to a designated position by referring to the relevant information stored in the relevant information storing unit 9 when a position on optional 3D information is designated from overlooking images displayed on the display 400 through the operation of the operating unit by the user.

In other words, when the operation accepting unit 7 accepts that the optional position on the overlooking image is designated by the operation of the user, the display control unit 5 is notified of the designated position. The display control unit 5 decides whether or not the position designated on the overlooking image is a position on the 3D information of the moving object by referring to the relevant information stored in the relevant information storing unit 9. If so, the display control unit 5 controls to input a photographed image to be specified by the image ID related to the designated position from the image input unit 1 and to cause the display 400 to display the photographed image.

In the case in which a plurality of image IDs is related to the position of the 3D information designated on the overlooking image, a photographed image corresponding to any of the image IDs may be displayed selectively on a single screen or photographed images corresponding to the image IDs may be divided and displayed on the single screen. In the case in which a single photographed image is displayed selectively, a selection rule thereof can be set optionally. For example, there is considered a rule for selecting a photographed image corresponding to the closest projection plane to a position of a viewpoint.

Figure 6:
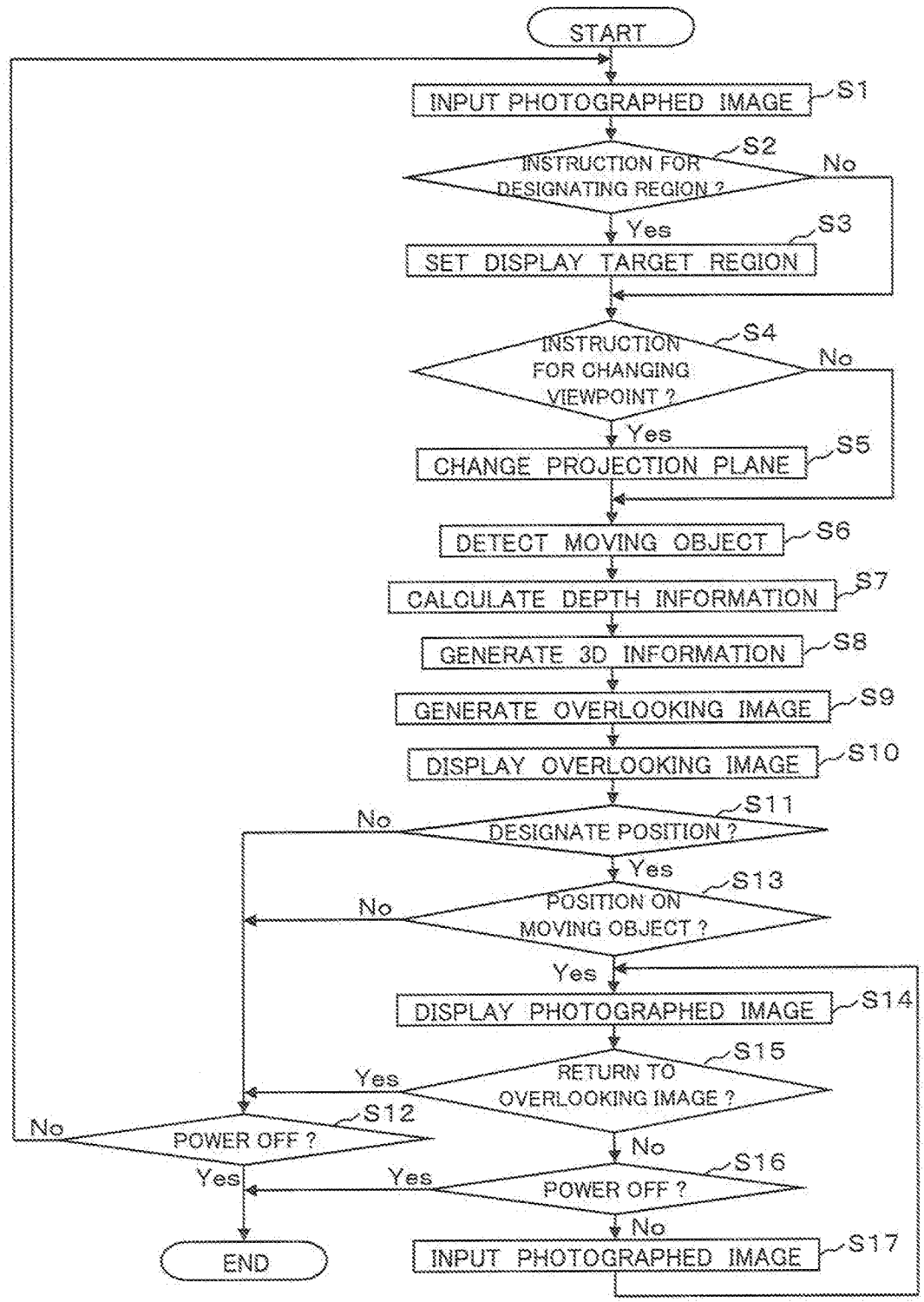
FIG. 6 is a flowchart showing an example of an operation of an image processing device to be one component of the image processing system according to the first embodiment.

FIG. 6 is a flowchart showing an example of an operation of the image processing device 300 to be one component of the image processing system according to the first embodiment having the structure described above. The flowchart shown in FIG. 6 is started when a power supply of the image processing device 300 is turned ON.

First of all, the image processing device 300 inputs photographed images corresponding to one frame obtained by the image pickup units 101 and 102 from the image input devices 201 and 202 (Step S1). Herein, the operation accepting unit 7 decides whether or not designation of a display target region is accepted from a user by the operation of the operating unit as to which region such as a whole building, a whole floor, a room in a floor, a corridor, a step or an elevator is to be displayed as an overlooking image on the display 400 (Step S2).

If the operation accepting unit 7 accepts the operation for designating a display target region, the 3D information generating unit 3 and the overlooking image generating unit 4 change setting to generate 3D information and an overlooking image for the designated display target region (Step S3). On the other hand, if the operation accepting unit 7 does not accept the operation for designating a display target region, the 3D information generating unit 3 and the overlooking image generating unit 4 do not change the setting described above. In an initial state, a compound region of the whole building is set to be the display target region, for example.

Next, the operation accepting unit 7 decides whether an operation for moving a position of a virtual viewpoint where the user sees the overlooking image is accepted or not (Step S4). If the operation accepting unit 7 accepts the operation of the designated movement, the 3D information generating unit 3 and the overlooking image generating unit 4 set the projection planes 31 to 34 seen in a position of the moved viewpoint (Step S5). On the other hand, if the operation accepting unit 7 does not accept the operation for moving a viewpoint, the 3D information generating unit 3 and the overlooking image generating unit 4 do not change the projection planes 31 to 34 described above.

Then, the depth information calculating unit 2 detects moving objects from each of the photographed images for the display target region input in the Step S1 (Step S6). Thereafter, the depth information calculating unit 2 calculates, every pixel, depth information representing a distance from the camera for each of the moving objects detected from the respective photographed images (Step S7).

Next, the 3D information generating unit 3 projects a value of each of pixels of the moving objects detected from the photographed images in the directions of the projection planes 31 to 34 in accordance with the depth information every photographing target region included in the display target region. Consequently, the 3D information of the moving objects are generated every photographing target region (Step S8).

Furthermore, the overlooking image generating unit 4 synthesizes the 3D information of the moving objects generated every photographing target region in the Step S8 with a space image corresponding to the display target region (an individual region formed by a single photographing target region or a compound region formed by a plurality of photographing target regions), thereby generating an overlooking image of the display target region (Step S9). Then, the display control unit 5 causes the display 400 to display the overlooking image thus generated (Step S10).

In a state in which the overlooking image is thus displayed on the display 400, the operation accepting unit 7 decides whether an operation for the user to designate an optional position on an overlooking image is accepted or not (Step S11). If the operation accepting unit 7 does not accept the position designating operation, the operation accepting unit 7 further decides whether an operation for turning OFF the power supply of the image processing device 300 is accepted or not (Step S12).

Herein, if the operation accepting unit 7 does not accept the operation for turning OFF the power supply, the processing returns to the Step S1 and a photographed image of a next frame is input. On the other hand, if the operation accepting unit 7 accepts the operation for turning OFF the power supply, the processing of the flowchart shown in FIG. 6 is ended.

If the operation accepting unit 7 accepts the operation for designating an optional position on an overlooking image in the Step S11, the display control unit 5 decides whether the position designated on the overlooking image is a position on the 3D information of the moving object or not by referring to the relevant information stored in the relevant information storing unit 9 (Step S13).

If the position designated on the overlooking image is not the position on the 3D information of the moving object, the processing proceeds to the Step S12. On the other hand, if the position designated on the overlooking image is the position on the 3D information of the moving object, the display control unit 5 causes the display 400 to display a photographed image to be specified by the image ID related to the designated position (Step S14).

Then, the operation accepting unit 7 decides whether an operation for returning the display of the photographed image to that of the overlooking image is accepted or not (Step S15). If the operation accepting unit 7 accepts the operation, the processing proceeds to the Step S12. On the other hand, if the operation accepting unit 7 does not accept the operation, it further decides whether the operation for turning OFF the power supply of the image processing device 300 is accepted or not (Step S16).

Herein, if the operation accepting unit 7 does not accept the operation for turning OFF the power supply, the image processing device 300 inputs a next frame of a photographed image corresponding to the image ID specified in the Step S14 (Step S17). Then, the processing returns to the Step S14 and the display control unit 5 causes the display 400 to display the input photographed image. On the other hand, if the operation accepting unit 7 accepts the operation for turning OFF the power supply, the processing of the flowchart shown in FIG. 6 is ended.

As described above in detail, according to the first embodiment, the 3D information of the moving object is generated as data on a group of a plurality of points formed by projection of the values of each pixel in the directions of the projection planes 31 to 34 in accordance with the depth information detected from the photographed images and the 3D information are synthesized with the space image of the display target region so that the synthesized image is displayed as a single whole overlooking image.

For this reason, even if the number of the photographing target regions is increased in a building having a large scale and a complicated floor structure or the like, a large number of photographed images are neither displayed on the display 400 by screen division nor displayed by switching through time division. In other words, a single overlooking image which has a plurality of photographing target regions in a whole space of the building, and which is formed by synthesizing the 3D information of the groups of a plurality of points in each of the photographing target regions is displayed on the display 400.

Consequently, the user can grasp a situation of the whole building at a glance by confirmation of the overlooking image. Moreover, it is also possible to eliminate a disadvantage that a display size of an individual photographed image displayed by screen division is decreased so that the photographed image is seen with difficulties. According to the first embodiment, therefore, it is also possible to offer an overlooking image of a building having a large scale and a complicated floor structure so as to be easily understood, and the user can readily grasp the situation of the whole building.

In general, a polygon model is used for drawing 3D information. Data having continuity and high precision is required for changing data on the group of a plurality of points into a polygon model. It is hard to change data having high intermittency and low precision into a polygon model and it is difficult to unify the data in a three-dimensional space. According to the first embodiment, data on the group of a plurality of points having high intermittency and low precision can also be used for drawing an image of a moving object which can be identified by a man.

According to the first embodiment, moreover, the values of the respective pixels of the moving objects included in the respective photographed images obtained by photographing the photographing target region at the angles are projected from the photographed images in the directions of the projection planes of the respective photographed images so that the 3D information are synthesized. By moving the position of the virtual viewpoint for seeing the overlooking image including the 3D information of the moving objects to change the azimuth of the projection plane, therefore, it is possible to perform optional switching into the overlooking image seen at various angles, thereby causing the display 400 to display the image.

In other words, according to the first embodiment, the overlooking image in the display target region including the 3D information of the moving objects processed into the data on the group of a plurality of points from the photographed images can be displayed on the display 400, and furthermore, the viewpoint of the overlooking image can be optionally switched for the display. By changing the angle of the overlooking image, consequently, it is also possible to display an object which is hidden behind something and cannot be seen at a certain angle, for example.

According to the first embodiment, moreover, it is possible to perform switching by optionally selecting which individual or compound region from a whole building, a whole floor, a room in a floor, a corridor, a step and an elevator so as to be the display target region of the overlooking image. Consequently, it is possible to instantaneously perform switching into an overlooking image in an individual region such as an optional room, a corridor, a step or an elevator as necessary, thereby confirming a motion of moving objects finely while comprehensively confirming the motion of the moving objects in each region on a single screen through an overlooking image in the compound region such as the whole building or the whole floor, for example.

According to the first embodiment, furthermore, each point (each pixel) of the data on the group of a plurality of points configuring the 3D information of the moving object has relevant information for relating a position on the overlooking image to the photographed image serving as the projection source of the value of the pixel. By designating the position of the moving object displayed on the overlooking image, therefore, it is also possible to perform switching into an original photographed image in which the designated moving object is present, thereby displaying the photographed image. Consequently, it is also possible to monitor the moving object more finely by a photographed image itself which has not been processed into the data on the group of a plurality of points.

Second Embodiment

Figure 7:
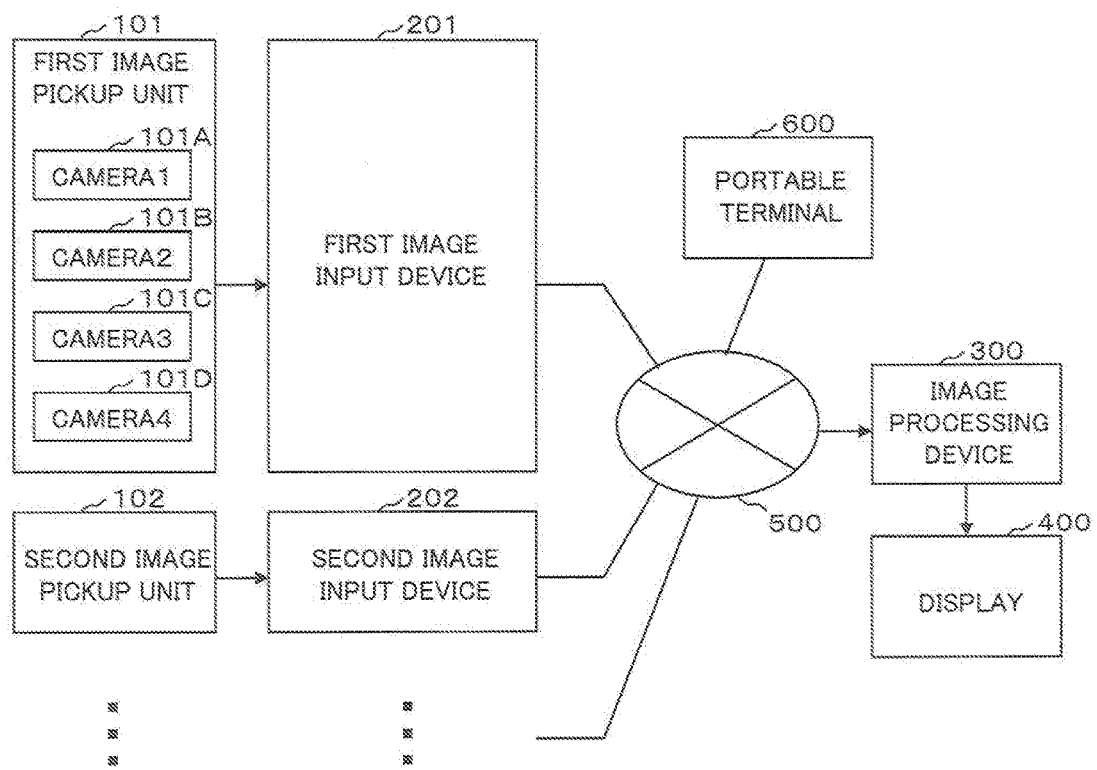
FIG. 7 is a diagram showing an example of a structure of the image processing system according to the second embodiment.

A second embodiment of the present invention will be described below with reference to the drawings. FIG. 7 is a diagram showing an example of a structure of an image processing system according to the second embodiment. The second embodiment also describes an example in which the image processing system according to the present invention is executed in a monitoring system.

As shown in FIG. 7, the monitoring system according to the second embodiment includes a portable terminal 600 such as a tablet, a notebook type personal computer or a smartphone in addition to each structure illustrated in FIG. 1. The portable terminal 600 includes a display for displaying an image. The portable terminal 600 is connected to an image processing device 300 through an in-house network 500.

Figure 8:
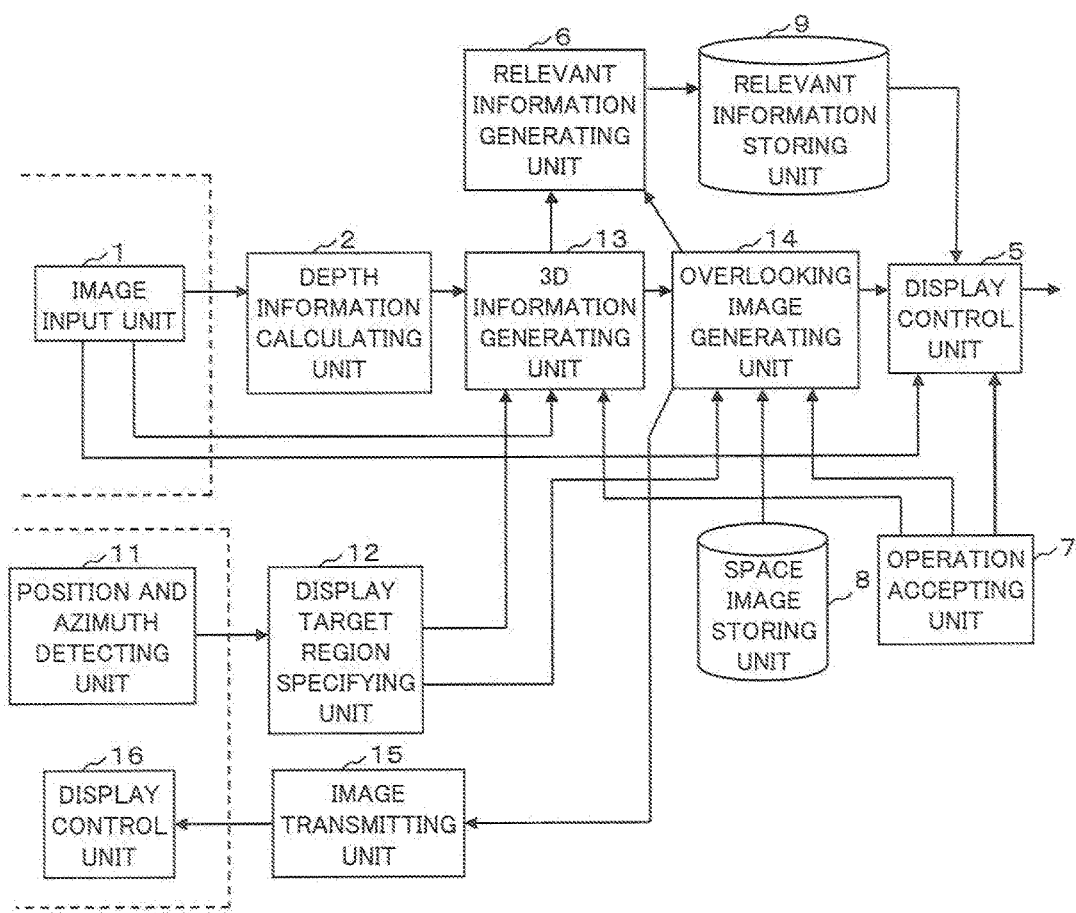
FIG. 8 is a block diagram showing an example of a functional structure of the image processing system according to the second embodiment.

FIG. 8 is a block diagram showing an example of a functional structure of the image processing system according to the second embodiment. Since components having the same symbols as those shown in FIG. 2 have the same functions in FIG. 8, repetitive description will be omitted.

As shown in FIG. 8, the image processing system according to the second embodiment includes a position and azimuth detecting unit 11, a display target region specifying unit 12, an image transmitting unit 15 and a display control unit 16 in addition to the functional structure illustrated in FIG. 2. Moreover, a 3D information generating unit 13 and an overlooking image generating unit 14 are provided in place of the 3D information generating unit 3 and the overlooking image generating unit 4.

Herein, functions of the position and azimuth detecting unit 11 and the display control unit 16 are provided in the portable terminal 600 shown in FIG. 1. Moreover, functions of the display target region specifying unit 12, the 3D information generating unit 13, the overlooking image generating unit 14 and the image transmitting unit 15 are provided in the image processing device 300 shown in FIG. 1.

Each of functions of a depth information calculating unit 2, the 3D information generating unit 13, the overlooking image generating unit 14, a display control unit 5, a relevant information generating unit 6, an operation accepting unit 7, the display target region specifying unit 12 and the image transmitting unit 15 provided in the image processing device 300 can also be configured from all of hardware, a DSP and software. If the each function is configured from the software, it actually includes a CPU, an RAM, an ROM and the like in the image processing device 300 and is implemented by an operation of an image processing program stored in a recording medium such as the RAM, the ROM, a hard disk or a semiconductor memory.

The position and azimuth detecting unit 11 detects a current position of the portable terminal 600 and a current azimuth where the portable terminal 600 is turned. The position and azimuth detecting unit 11 is configured from a GPS receiver, for example. The position and azimuth detecting unit 11 always detects the current position and the current azimuth of the portable terminal 600 and always transmits the detected information to the image processing device 300 through the in-house network 500.

The display target region specifying unit 12 of the image processing device 300 specifies, as a display target region, any of photographing target regions which is to be displayed as an overlooking image based on the current position and the current azimuth of the portable terminal 600 which are detected by the position and azimuth detecting unit 11.

Figure 9:
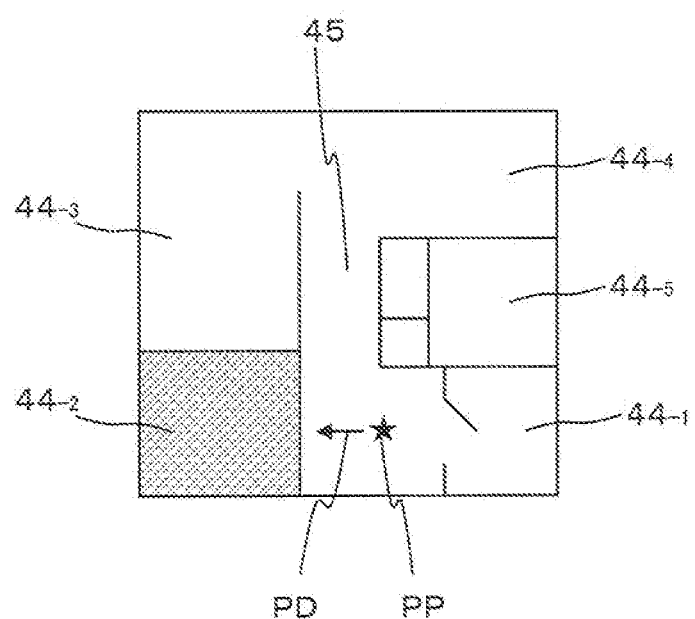
FIG. 9 is a view for explaining processing of a display target region specifying unit according to the second embodiment.

FIG. 9 is a view for explaining processing to be performed by the display target region specifying unit 12. Herein, a layout of the floor shown in FIG. 4(*b*) is illustrated. It is assumed that a monitoring person holding the portable terminal 600 is present in a corridor 45 of the floor and turns the portable terminal 600 in a direction of a room 44$_{-2}$. In this case, a current position PP and a current azimuth PD of the portable terminal 600 are detected by the position and azimuth detecting unit 11 and are transmitted to the image processing device 300.

The display target region specifying unit 12 of the image processing device 300 specifies, as a display target region for displaying an overlooking image, a photographing target region of the room 44$_{-2}$ in a direction of the current azimuth PD from the current position PP of the portable terminal 600 detected by the position and azimuth detecting unit 11.

The 3D information generating unit 13 has the following function in addition to the function described in the first embodiment. In other words, if a display target region is specified by the display target region specifying unit 12, the 3D information generating unit 13 generates 3D information for a photographing target region included in the specified display target region by the method described in the first embodiment. In an example of FIG. 9, only the photographing target region of the room 44$_{-2}$ is included in the display target region.

Herein, it is possible to optionally determine which angle is set to projection planes 31 to 34 in the generation of the 3D information. For example, the angles of the projection planes 31 to 34 are dynamically set depending on the current position PP and the current azimuth PD in such a manner that an overlooking image is displayed as seen in the direction of the current azimuth PD from the current position PP detected by the position and azimuth detecting unit 11. Alternatively, the projection planes 31 to 34 may be preset to predetermined angles in such a manner that the overlooking image is displayed at a fixed angle shown in FIG. 4(*b*), for example.

The overlooking image generating unit 14 has the following function in addition to the function described in the first embodiment. In other words, in the case in which the display target region is specified by the display target region specifying unit 12, the overlooking image generating unit 14 generates an overlooking image for the specified display target region. Then, the overlooking image generating unit 4 supplies the generated overlooking image to the image transmitting unit 15.

The image transmitting unit 15 transmits the overlooking image generated by the overlooking image generating unit 14 to the portable terminal 600. The display control unit 16 of the portable terminal 600 causes a display (not shown) of the portable terminal 600 to display the overlooking image transmitted by the image transmitting unit 15 as an overlooking image of the display target region in the direction of the current azimuth PD from the current position PP detected by the position and azimuth detecting unit 11.

As described above in detail, according to the second embodiment, it is possible to display a motion of a moving object which is being moved at the other side of a wall or over another floor as if it is seen through by using the portable terminal 600. Consequently, when tracking a specific man, for example, a monitoring person can confirm a motion of the man in real time in a different place from a place where the man is present. Accordingly, a monitoring capability can be enhanced dramatically.

Although the description has been given to the example in which the overlooking image is displayed on the display of the portable terminal 600 in the second embodiment, the present invention is not restricted thereto. For example, a portable type display such as an HUD (Head-Up Display) may be used. In this case, it is preferable to provide a GPS receiver or a data transmitting/receiving function on the portable type display.

Third Embodiment

A third embodiment of the present invention will be described below with reference to the drawings. A structure of an image processing system according to the third embodiment is the same as that in FIG. 1 or FIG. 6. In other words, the image processing system according to the third embodiment is an application example of the first embodiment or the second embodiment described above. The third embodiment will be described below as the application example of the first embodiment.

Figure 10:
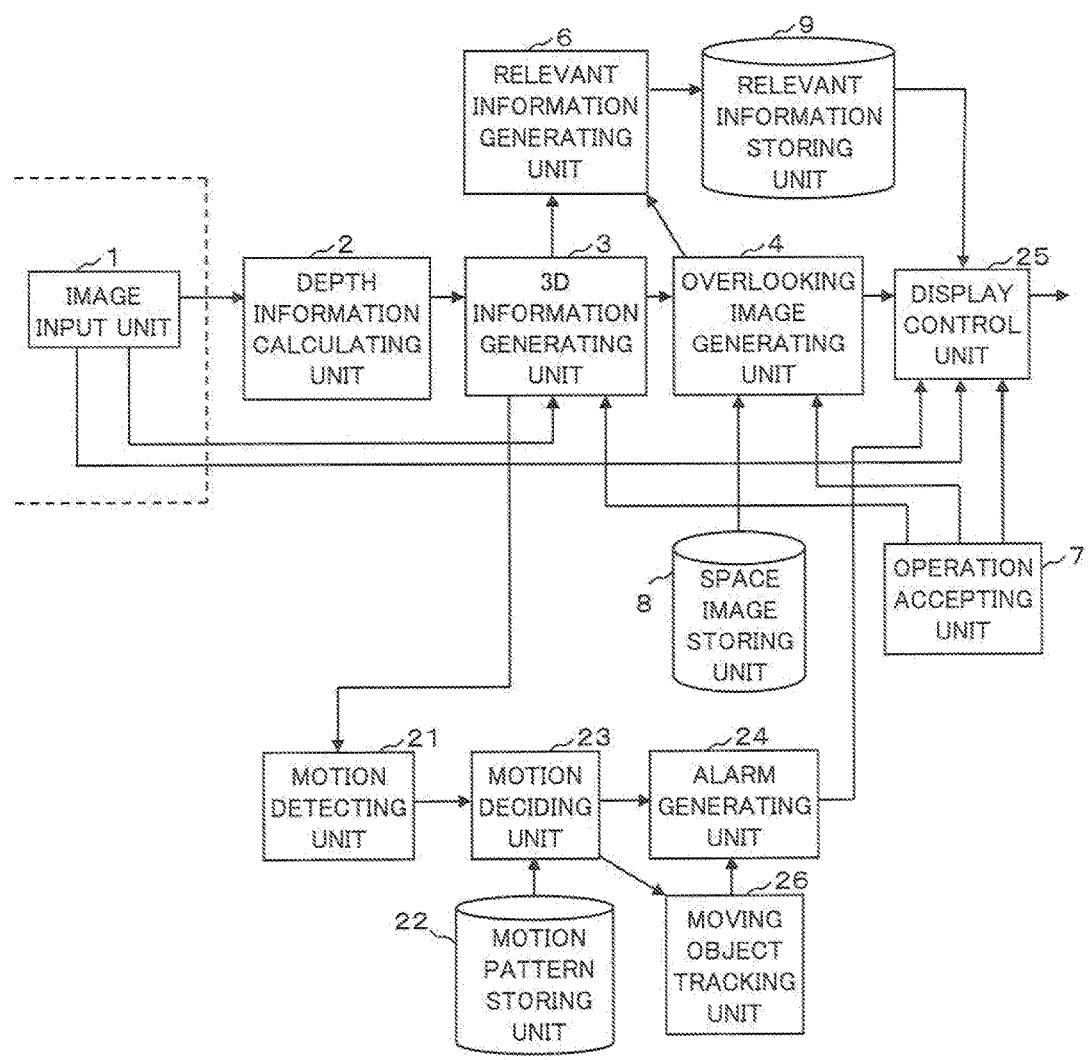
FIG. 10 is a block diagram showing an example of a functional structure of the image processing system according to the third embodiment.

FIG. 10 is a block diagram showing an example of a functional structure of the image processing system according to the third embodiment. Since components having the same symbols as those shown in FIG. 2 have the same functions in FIG. 10, repetitive description will be omitted.

As shown in FIG. 10, the image processing system according to the third embodiment includes a motion detecting unit 21, a motion pattern storing unit 22, a motion deciding unit 23, an alarm generating unit 24 and a moving object tracking unit 26 in addition to the functional structure shown in FIG. 2. Moreover, a display control unit 25 is provided in place of the display control unit 5. All of the motion detecting unit 21, the motion pattern storing unit 22, the motion deciding unit 23, the alarm generating unit 24, the display control unit 25 and the moving object tracking unit 26 are provided in the image processing device 300 shown in FIG. 1.

Each of functions of a depth information calculating unit 2, a 3D information generating unit 3, an overlooking image generating unit 4, the display control unit 25, a relevant information generating unit 6, an operation accepting unit 7, the motion detecting unit 21, the motion deciding unit 23, the alarm generating unit 24 and the moving object tracking unit 26 provided in the image processing device 300 can also be configured from all of hardware, a DSP and software. If the each function is configured from the software, it actually includes a CPU, an RAM, an ROM and the like in the image processing device 300 and is implemented by an operation of an image processing program stored in a recording medium such as the RAM, the ROM, a hard disk or a semiconductor memory.

The motion detecting unit 21 analyzes a change on a time base of 3D information generated by the 3D information generating unit 3, thereby detecting a motion of a moving object represented by the 3D information. In other words, the 3D information is sequentially generated by the 3D information generating unit 3 using a photographed image photographed sequentially by image pickup units 101 and 102 in accordance with a predetermined frame rate. Therefore, the motion detecting unit 21 detects an inter-frame difference of the 3D information to be generated sequentially, thereby detecting the motion of the moving object to be represented by the 3D information.

In the present embodiment, there is detected a small change in a shape of the moving object as well as a situation of movement of the moving object. Since the 3D information is configured from data on a group of a plurality of points, such a small change can also be detected. For example, if the moving object is a person, the motion detecting unit 21 can also detect a motion of a skeletal structure of a human body.

The motion pattern storing unit 22 prestores data on a specific motion pattern related to the moving object. The motion pattern storing unit 22 stores data on a motion pattern, for example, in which a right shoulder is moved upward and a left shoulder is moved downward with such consciousness as to lift a heavy baggage when a person holds the baggage in a right hand or a vertical motion is increased more than usual if a person walks with the heavy baggage held.

The motion deciding unit 2 stereoecides whether or not the motion of the moving object detected by the motion detecting unit 21 is coincident with the motion pattern stored in the motion pattern storing unit 22. Herein, the coincidence has a concept including the case in which a coincidence degree is equal to or higher than a predetermined value in addition to perfect coincidence.

Figure 11:
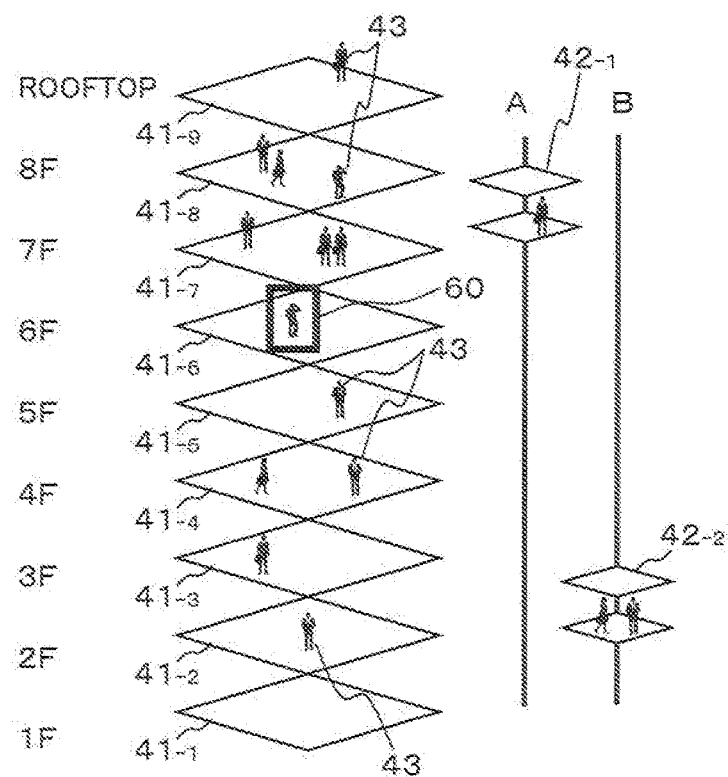
FIG. 11 is a view showing an example of an alarm to be generated by an alarm generating unit according to the third embodiment.

The alarm generating unit 24 generates a predetermined alarm if it is decided that the motion of the moving object is coincident with the motion pattern by the motion deciding unit 23. For example, the alarm generating unit 24 controls the display control unit 25 to display a frame 60 around the moving object decided to be coincident with the motion pattern as shown in FIG. 11. An alarm sound may be made together with the display of the frame 60.

The moving object tracking unit 26 tracks a motion on a time base of the moving object which is decided to be coincident with the motion pattern by the motion deciding unit 23. The motion of the skeletal structure of the human body to be detected by the motion detecting unit 21 is peculiar to some degree and can also be utilized for specifying continuity. Consequently, it is possible to specify that 3D information to be sequentially generated from a photographed image of one photographing target region are obtained from the same moving object based on peculiarity of a motion thereof, thereby tracking the moving object.

Figure 12:
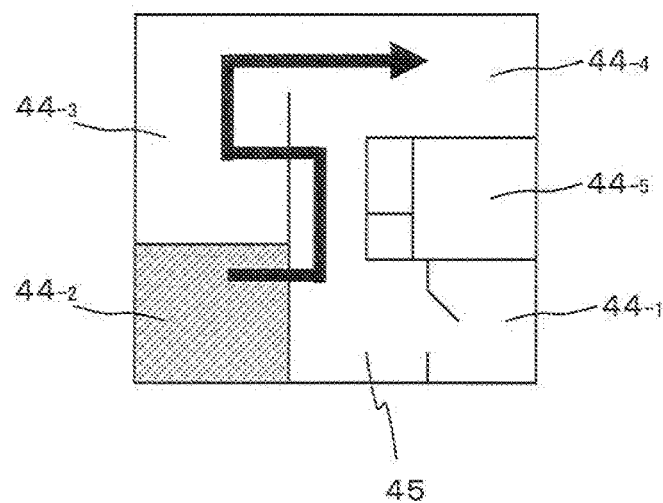
FIG. 12 is a view showing an example of a motion of a moving object to be tracked by a moving object tracking unit according to the third embodiment.

Also in the case in which the moving object is moved across a plurality of photographing target regions as shown in FIG. 12, moreover, the moving object can be tracked continuously. In other words, it is possible to easily specify, based on peculiarity of a motion of a moving object, that 3D information generated for a photographing target region of a room $44_{-2}$ when the moving object is present in the room $44_{-2}$ and 3D information generated for a photographing target region of a corridor 45 after movement of the moving object to the corridor 45 are obtained from the same moving object. Therefore, it is possible to reliably track the moving object to be moved across a plurality of photographing target regions.

The alarm generating unit 24 is notified of a tracking result of the moving object obtained by the moving object tracking unit 26, for example. Upon receipt of the tracking result, the alarm generating unit 24 displays the frame 60 for an alarm through tracking around the moving object decided to be coincident with the motion pattern by the motion deciding unit 23.

Although the description has been given to the example in which the analysis processing is performed by the motion detecting unit 21, the motion deciding unit 23, the alarm generating unit 24 and the moving object tracking unit 26 in real time together with photographing through the image pickup units 101 and 102 in the third embodiment, the present invention is not restricted thereto. For example, an overlooking image to be sequentially generated by the overlooking image generating unit 4 may be stored in a database to subsequently perform the analysis processing with the stored overlooking image as a target.

By the subsequent analysis processing for the overlooking image stored in the database, moreover, it is also possible to detect a characteristic motion of a person doing something dishonest in the past by the motion detecting unit 21 and to store the motion, in the motion pattern storing unit 22, as data on a motion pattern. Thus, it is possible to easily monitor a suspicious person. In other words, when the suspicious person enters a photographing target region, the frame 60 can be displayed around 3D information of the suspicious person to call attention of a monitoring person.

Moreover, it is also possible to extract and display only any of the overlooking images stored sequentially in the database in a time zone including a moving object having a specific motion. In that case, it is also possible to display a locus of the moving object and to display a serial motion of the moving object like a strobe picture. Moreover, it is also possible to emphasize and display a portion having a specific change by the motion of the skeletal structure. Furthermore, it is also possible to easily see the motion of the moving object by thinning a time interval to be displayed.

Although the description has been given to the example in which the image processing system according to the present invention is executed in the monitoring system in the first to third embodiments, the present invention is not restricted thereto. For example, it is also possible to execute the image processing system in a system for analysis of visitors in a retail store (measurement of the number of people, purchase action recognition or the like), safety confirmation or wandering confirmation in a nursing and caring facility or a hospital, or the like.

Although the description has been given to the example in which the stereo camera is used as means for detecting the depth information of the moving object in the first to third embodiments, moreover, the present invention is not restricted thereto. For example, an ordinary camera may be used in place of the stereo camera, while a sensor for measuring a distance using a radar, infrared rays, ultrasonic waves or the like may be utilized to measure a distance from the image pickup units 101 and 102 to the moving object.

In order to generate the 3D information of the moving object as point group data, moreover, it is not indispensable to pick up an image by using a camera. In other words, it is also possible to generate the 3D information of the moving object as point group data having no color information based on distance information (depth information) by measuring a distance to the moving object from a device capable of outputting the distance information, for example, a radar, an infrared sensor or the like with use of the device. In this case, an appropriate color is used to perform drawing.

In addition, all of the first to third embodiments are only illustrative for concreteness to carryout the present invention and the technical scope of the present invention should not be thereby construed to be restrictive. In other words, the present invention can be carried out in various configurations without departing from the gist or main features thereof.

The invention claimed is:

1. An image processing system comprising:
   an image input unit for inputting images photographed respectively by a plurality of cameras provided to photograph a photographing target region at a plurality of angles;
   a depth information calculating unit for calculating, every pixel, depth information representing distances from the cameras of moving objects included in a plurality of photographed images input by the image input unit;
   a 3D information generating unit for setting a plurality of projection planes in adaptation to a relative angular relationship between the cameras and projecting values of each of pixels of the moving objects included in the photographed images input by the image input unit in directions of the projection planes corresponding to the respective photographed images in accordance with the depth information, thereby generating 3D information obtained by synthesizing, into one, the moving objects included in the photographed images;
   an overlooking image generating unit for synthesizing the 3D information of the moving object generated by the 3D information generating unit with a space image representing a space of the photographing target region, thereby generating an overlooking image of the photographing target region; and
   a display control unit for displaying, on a display, the overlooking image generated by the overlooking image generating unit.

2. The image processing system according to claim 1 further comprising a relevant information generating unit for generating relevant information relating positions of respective pixels configuring the 3D information to a photographed image serving as projection sources of values of the pixels, thereby storing the relevant information in a relevant information storing unit,
wherein when a position on the 3D information is designated, the display control unit displays, on the display, a photographed image related to the designated position by referring to the relevant information stored in the relevant information storing unit.

3. The image processing system according to claim 1, wherein the display is configured from a portable type display or a display provided in a portable terminal, and further includes:
a position and azimuth detecting unit for detecting a current position of the portable type display or the portable terminal and a current azimuth where the display is turned; and
a display target region specifying unit for specifying, as a display target region, any of the photographing target regions which is to be displayed as the overlooking image based on the current position and the current azimuth detected by the position and azimuth detecting unit,
the 3D information generating unit generates the 3D information for the photographing target region included in the display target region specified by the display target region specifying unit,
the overlooking image generating unit generates the overlooking image for the display target region specified by the display target region specifying unit, and
the display control unit displays, on the display, the gird's-eye view image of the display target region specified by the display target region specifying unit.

4. The image processing system according to claim 1 further comprising:
a motion detecting unit for analyzing a change on a time base of the 3D information generated by the 3D information generating unit, thereby detecting a motion of the moving object represented by the 3D information;
a motion pattern storing unit for storing data on a predetermined motion pattern related to the moving object;
a motion deciding unit for deciding whether or not the motion of the moving object detected by the motion detecting unit is coincident with a motion pattern stored in the motion pattern storing unit; and
an alarm generating unit for generating an alarm when it is decided that the motion of the moving object is coincident with the motion pattern by the motion deciding unit.

5. The image processing system according to claim 4 further comprising a moving object tracking unit for tracking a motion on a time base of the moving object decided to be coincident with the motion pattern by the motion deciding unit.

* * * * *